(No Model.)
P. C. GIBBONS & G. R. HEABERLIN.
SICKLE DRIVING MECHANISM.
No. 428,088. Patented May 20, 1890.
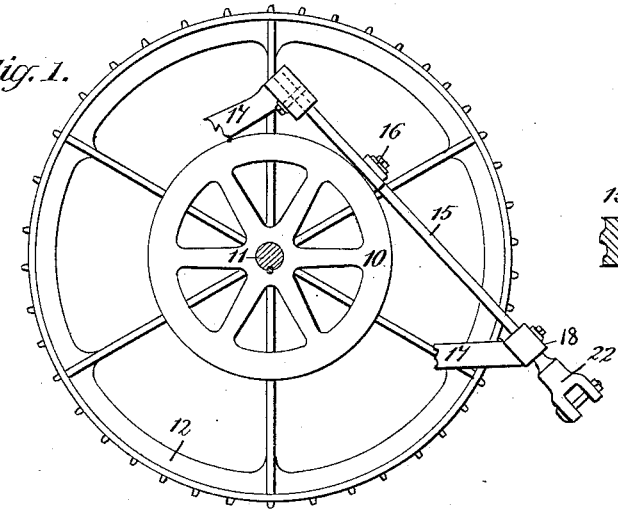
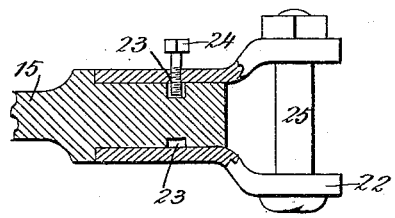
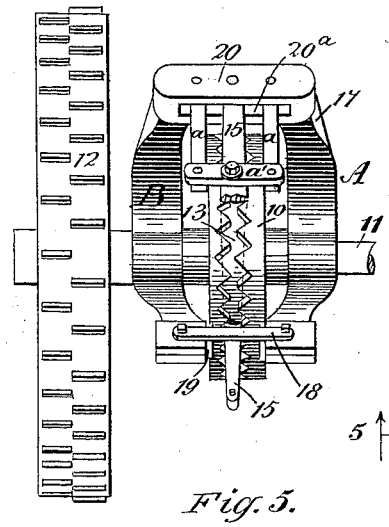
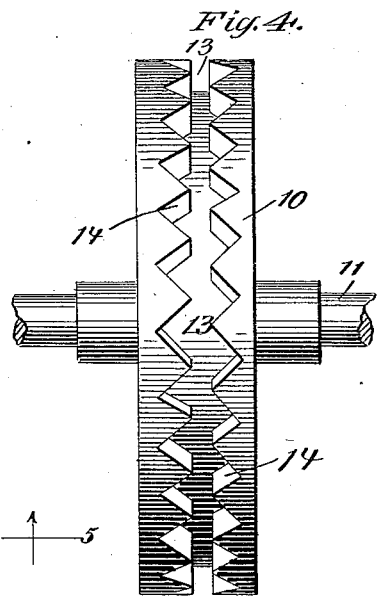
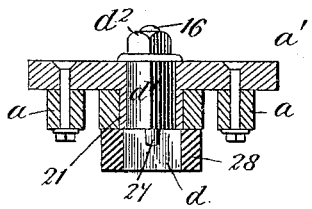
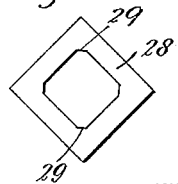
WITNESSES:
INVENTOR:
P. C. Gibbons
G. R. Heaberlin
BY Munn & Co.
ATTORNEYS.

UNITED STATES PATENT OFFICE.

PATRICK CHARLES GIBBONS AND GEORGE RAMSEY HEABERLIN, OF BARING, MISSOURI.

SICKLE-DRIVING MECHANISM.

SPECIFICATION forming part of Letters Patent No. 428,088, dated May 20, 1890.

Application filed August 7, 1889. Serial No. 319,990. (No model.)

*To all whom it may concern:*

Be it known that we, PATRICK CHARLES GIBBONS and GEORGE RAMSEY HEABERLIN, of Baring, in the county of Knox and State of Missouri, have invented a new and useful Improvement in Sickle-Driving Mechanism, of which the following is a full, clear, and exact description.

Our invention relates to improved sickle-driving mechanism for use in connection with the sickle-bars of mowers and other sickle-carrying machines, and has for its object to provide a means whereby a uniform movement will be imparted to the sickle-bars, and whereby, also, the said bars when in operation may not become clogged.

A further object of the invention is to provide a pin adapted to travel in the groove in the sickle-driving wheel, which will sustain friction equally upon all its faces and be capable of instantaneous reverse movement.

The invention consists in the novel construction and combination of the several parts, as will be hereinafter fully set forth, and pointed out in the claims.

Reference is to be had to the accompanying drawings, forming a part of this specification, in which similar letters and figures of reference indicate corresponding parts in all the views.

Figure 1 is a side elevation of a sickle-driving wheel and lever, the former being attached to the axle of a mower. Fig. 2 is a front elevation of the said wheel, the frame surrounding the wheel, and the main drive-wheel of the implement. Fig. 3 is a section through the lower end of the lever, illustrating the attachment thereto of a knuckle, whereby the lever is connected, through the medium of a pitman, with the sickle-bars. Fig. 4 is an enlarged face view of the sickle-driving wheel. Fig. 5 is a vertical section through a portion of the frame and lever, illustrating the groove-pin in side elevation, the section being taken on line 5 5 of Fig. 7. Fig. 6 is a plan view of a shell adapted for use in connection with the groove-pin, and Fig. 7 is a partial plan of the lever and pivoted guide-frame for the groove-pin.

The sickle-driving wheel 10 is fixed upon the axle 11 of the implement, and the size of the wheel is regulated by that of the main drive or truck wheels 12, being about one-half the diameter of the latter. The wheel 10 is provided with a peripheral groove 13, preferably an inch deep and an inch wide, and the side walls of the said groove are formed in a series of inclined planes 14, the length and angle of which planes depend upon the length and number of the strokes to be imparted to the sickles at each revolution of the truck-wheels 12. The inclined planes 14 of each side are alternately arranged to form a circuitous or zigzag angular course, as best illustrated in Fig. 4.

In connection with the wheel a lever 15 is employed, preferably constructed from a flat bar of iron about three inches wide where the groove-pin 16 is secured, tapering to one inch at the lower end and to two inches at the upper end; but the said lever may be otherwise formed, if desired.

A frame 17, comprising two curved members A and B united at the top, is mounted on the axle, upon which the grooved sickle-wheel is keyed, one member being located at each side of the sickle-wheel, as shown in Fig. 2. The lower extremities of the members A and B are connected by a cross-bar 18, attached to the upper face, and a bumper 19, of elastic material, is fastened to the inner face of each member at the lower extremity.

The upper cross-bar 20 of the frame 17 is provided with a longitudinal side slot 20ª, in which the upper ends of two links $a$ are pivoted, the lower ends of the links being pivotally connected by a strap or cross-head $a'$, which links and cross-head constitute a pivoted guide-frame for the groove-pin 16.

The lever 15 is pivoted at its upper end in the center of the frame-slot 20ª between the links of the pivotal guide-frame, and the lever extends downward beneath the cross-head of the latter frame and the connecting-bar 18 and outward beyond and between the lower members of the main frame and the bumpers 19. The lower end of the lever is provided with a knuckle 22 (best shown in Fig. 3) for connection with the sickles of the mower through the medium of a pitman or similar device. The knuckle is slipped over the end of the lever, which is grooved, as shown at 23, and secured by a set-screw 24, passing through the knuckle into the groove, and through the outer end of the knuckle, which consists of two spaced arms, a bolt or pin 25 is passed.

Upon the under side of the cross-head $a'$ of the pivotal guide-frame a circular sleeve 21 is attached, or formed integral therewith, provided with a square vertical bore, which bore extends from the bottom of the sleeve to the upper face of the cross-head, as best shown in Fig. 5. The sleeve 21 acts as a bushing and fits loosely in an aperture produced in the lever 15.

The groove-pin 16 is preferably made in three diameters, the base-section $d$ being the largest, the intermediate section $d'$ next in size, and the upper section $d^2$ the smallest. The intermediate section is rectangular, and is passed up through the bore of the bushing or sleeve 21, being of equal length with said bushing, whereby the lower section $d$ contacts with the under edge of the latter. The upper section $d^2$ of the pin is round and threaded to receive the nut and washer, retaining the pin in position. The lower section of the pin is rectangular in cross-section, and in each corner of the base-section $d$ at the top a recess 27 is formed, and the said base-section is provided with a shell or jacket 28 of similar shape. (Illustrated in detail in Fig. 6.) In the inner corners of the shell or jacket, near the upper edge, projections or lugs 29 are cast or otherwise produced adapted to enter the recesses 27 in the pin, as shown in Fig. 5. By these means the shell is rigidly held in contact with the base-section when the pin is secured in position, as the shell and base-section are of the same height, and the contour of the shell permits it to neatly fit and slide in the groove 13 of the sickle-driving wheel.

It will be observed that the planes in the groove in the sickle-driving wheel are at right angles to each other, and that at the intersection of the planes an acute angle is formed; also, that a square pin is employed to slide in the groove. By reason of this construction we avoid the accumulation of grass in the sickle, caused usually by the extremely slow motion of said sickle at both ends of the stroke while a crank-pin is passing a center or a round pin is passing around corners in a groove. By the employment of a square groove-pin and square corners for the groove of the sickle-driving wheel a uniform movement is imparted to the sickle throughout its entire stroke, thus keeping it at all times clear of grass and other obstructions.

A waste of space upon the periphery of the sickle-driving wheel is inevitable when a round-cornered groove and round pin is used, as considerable space is required to permit the reverse movement of the pin at the end of the stroke. With a square-cornered groove and square pin fifty-two strokes are readily obtained from a wheel fifty-two inches in circumference, while with a round-cornered groove and round pin it requires a wheel seventy-one and a half inches in circumference to attain the same results. With a square-cornered pin and corresponding groove there is no waste of space, as the reverse movement of the pin at the end of the stroke is accomplished without a pause and without necessitating any alteration of the width of the groove throughout its length; and to provide against damage from the end of the lever when this reverse movement is quickly made the bumpers are attached to the main frame, which bumpers relieve the lever from all strain.

Having thus described our invention, we claim as new and desire to secure by Letters Patent—

1. The combination, with a sickle-driving wheel provided with a peripheral groove, the sides of which are formed in a series of inclined planes at a right angle to each other, producing square corners in the groove, of a lever adapted for connection with the sickle-bars, and a square pin carried by said lever capable of traveling in the groove of the sickle-driving wheel, substantially as shown and described.

2. The combination, with a sickle-driving wheel provided with a peripheral groove, the side walls of which are formed in inclined planes producing sharp angles at their point of intersection and forming, essentially, a square-cornered groove, of a lever adapted for connection with the sickle-bars, a pin carried by said lever, and a square shell attached to the said pin, adapted to enter the groove in the said sickle-wheel, substantially as and for the purpose specified.

PATRICK CHARLES GIBBONS.
GEORGE RAMSEY HEABERLIN.

Witnesses:
JOHN W. SETTLE,
J. R. DURKEE.